Nov. 3, 1964 G. W. WELLS 3,155,920

TWO INTERCONNECTED BLOCKING OSCILLATORS

Filed July 27, 1961

INVENTOR.
G. W. WELLS

BY R. B. Ardis

ATTORNEY

United States Patent Office 3,155,920

Patented Nov. 3, 1964

3,155,920

TWO INTERCONNECTED BLOCKING OSCILLATORS

George W. Wells, Springfield, N.J., assignor to Bell Telephone Laboratories, Incorporated, New York, N.Y., a corporation of New York Filed July 27, 1961, Ser. No. 127,350

6 Claims. (Cl. 331—56)

Figure 1A:
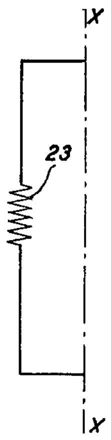

This invention relates to pulse generators and more particularly to circuit arrangements for synchronously generating pulses of the same polarity alternately in time on parallel outputs.

Among the advanced circuit currently being employed in pulse systems are magnetic core pulse switching circuits of the type disclosed in copending applications Serial No. 425,847, filed April 27, 1954, by M. Karnaugh, and U.S. Patent 2,719,961, issued October 4, 1955, to M. Karnaugh. These pulse switching circuits require for their operation so-called two-phase trigger circuitry in which pulses of the same polarity appear alternately in time at two output terminals. Among the more common techniques employed by experimenters to provide such circuitry are two blocking oscillators triggered alternately by a free-running multivibrator of the proper frequency. Such drive circuitry requires a relatively large number of active elements and interconnecting circuitry relative to the job to be performed.

A principal object of this invention is to reduce the cost and complexity of two-phase drive circuitry.

A related object of this invention is to eliminate the free-running multivibrator required by two-phase drive circuitry.

A further object of this invention is to improve the reliablility of two-phase drive circuitry through the elimination of half the number of active elements previously required.

Still another object of this invention is to reduce the power requirements of two-phase drive circuitry.

In accordance with this invention the timing circuits of two blocking oscillators are interconnected by means of a voltage dropping device to form an astable pulse generator. Pulses are synchronously generated alternately in time by the blocking oscillators due to the fact that a first triggered blocking oscillator generates a current which increases the recovery period for the second blocking oscillator. The second blocking oscillator "recovers" before the first, however, and the second then generates a current which increases the recovery period of the first blocking oscillator, which still "recovers," however, before the second blocking oscillator, and repeats the process.

Figure 1:
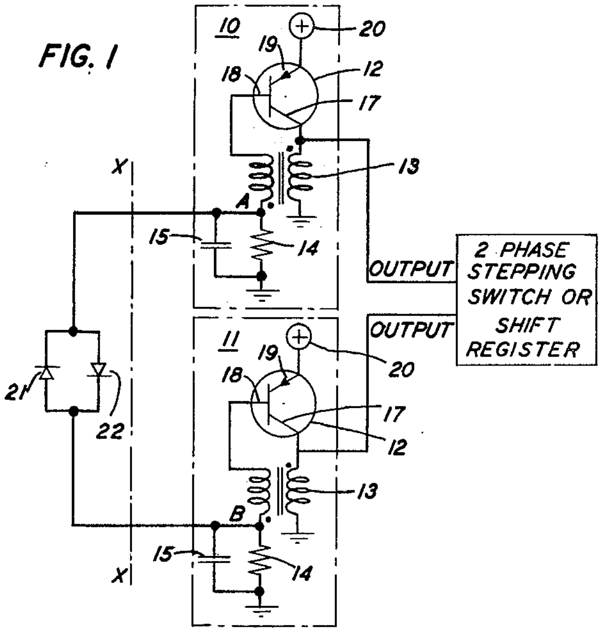
Figure 2:
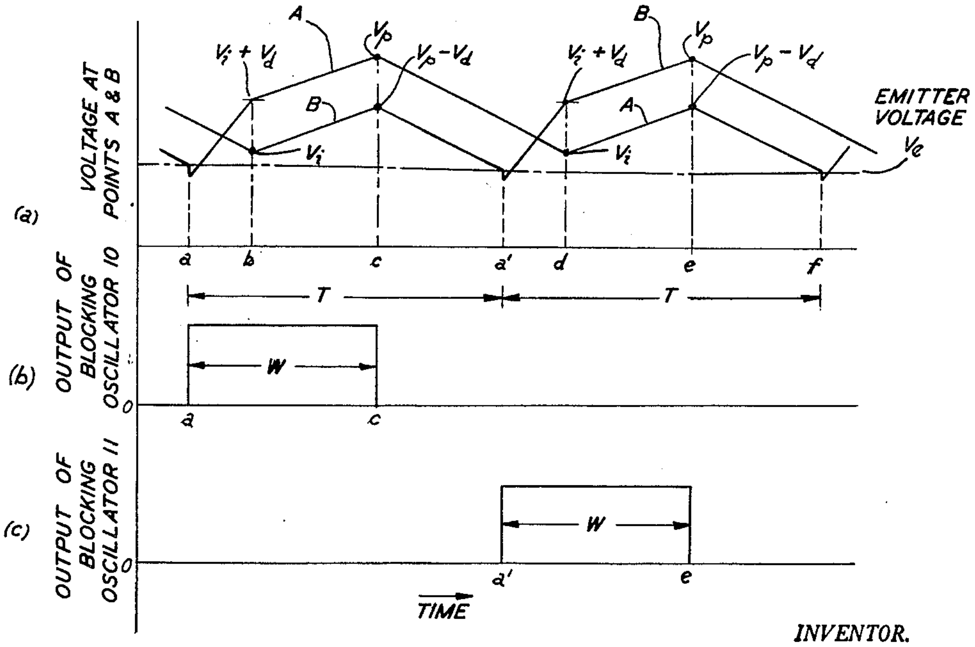

This invention will be more fully comprehended from the following detailed description taken in conjunction with the drawing in which:

FIGS. 1 and 1A are drawings of a pulse generator circuit embodying the invention; and FIG. 2 is a series of waveforms showing the timing circuit voltages and pulse output voltages of the blocking oscillators.

A pair of identical blocking oscillators 10 and 11 are employed in a circuit embodying the invention shown in FIG. 1. Each blocking oscillator comprises a p-n-p junction transistor 12, a pulse transformer 13 and a timing circuit consisting of the parallel combination of a resistor 14 and capacitor 15. One winding of the transformer 13 is connected between the collector output electrode 17 of the transistor and ground, while the second winding, herein designated the base winding, is connected between the base electrode 18 and the parallel combination of resistor 14 and capacitor 15 which comprises the timing circuit.

Each blocking oscillator, considered as a separate entity, is triggered into operation when the charge stored on the capacitor 15 in the timing circuit has been dissipated through its associated resistor 14 so that the voltage at the base electrode 18 of the transistor is equal to the source voltage 20, at the emitter electrode 19. The transistor then conducts and the voltage at the collector output electrode 17 rises, causing a voltage to be developed across the base winding of transformer 13. The polarity of the transformer is such that a rise in collector voltage results in a drop in base electrode voltage and an increase in the voltage applied to the timing circuit of the blocking oscillator. The drop in base electrode voltage causes the transistor to conduct more heavily and the resulting action is of a regenerative nature. This regenerative action continues until the transistor is saturated after which time the regenerative action can no longer continue and the collector voltage moves toward zero voltage. The voltage developed across the base winding of the transformer 13 is then reversed and the base electrode voltage goes positive, turning the transistor "off." Capacitor 15 now discharges exponentially through resistor 14 and when the base voltage is equal to the emitter voltage 20 the process repeats itself.

In the embodiment of the invention shown in FIG. 1 each blocking oscillator 10 and 11 is coupled to the other by means of a double diode arrangement. The diode arrangement comprises a pair of diodes 21, 22 with one poled to provide a low impedance to current flow in one direction and the other poled to provide a low impedance to current flow in the opposite direction. This double diode arrangement 21, 22 may be replaced by a simple resistor 23, shown in FIG. 1A, but the use of the double diode arrangement is preferable since it provides a constant voltage drop (equal to the forward voltage drop of the diode) in either direction regardless of the direction of circuit flow. The double diode arrangement 21, 22 is connected between corresponding points A and B of the timing circuits of the blocking oscillators. Points A and B are located at the junction of the base winding of transformer 13 and the timing circuit of each blocking oscillator 10 and 11, respectively.

The result of such an interconnection may best be understood by reference to FIG. 2, line (*a*) in which all voltage curves have been drawn, in the interest of clarity, as interconnected straight lines rather than interconnected exponential curves which they are in reality. In the interest of clarity the time intervals *ac* and *a'e* have also been greatly expanded. At time *a* the voltage at point A in the timing circuit of blocking oscillator 10 has dissipated to a point where the base voltage is equal to the emitter voltage. Blocking oscillator 10 is now triggered into operation, and the collector voltage output rises, causing a voltage to be developed across the base winding of the pulse transformer 13. Since the base electrode 18 of the transistor 12 of blocking oscillator 10 is clamped to the emitter source voltage 20 by the forward biased base-emitter junction, the voltage at point A moves in a positive direction with respect to the emitter voltage 20. Capacitor 15 of blocking oscillator 10 is therefore charged by the base current of the transistor and when, at time *b*, the voltage at point A is greater than that at point B by the voltage drop $V_d$, across the diodes 21, 22, base current also flows to charge capacitor 15 of blocking oscillator 11. The voltages of points A and B both rise with respect to the emitter voltage, but the voltage of point A rises to a greater value than that of point B since blocking oscillator 10 is the source of current and a voltage drop $V_d$ must exist between points A and B. When the collector voltage of transistor 12 of blocking oscillator 10 moves toward zero at the cessation of regenerative action at time *c* the voltage developed across the base winding of the pulse transformer reverses, driving the base electrode voltage positive with respect to point A, turning off transistor 12 of blocking oscillator 10. The voltages at points A and B now decrease exponentially toward ground. Since point B is charged to a lower voltage than point A it will reach the emitter voltage level first at time $a'$ and blocking oscillator 11 fill be triggered into operation. The process will now repeat itself with the exception of the fact that point B will now be charged to a higher voltage level than point A during the conductive period of the transistor 12 of blocking oscillator 11 and when the transistor ceases to conduct at time $e$ at the cessation of regenerative action the voltage levels of points A and B will decrease toward the emitter voltage but point A will reach that level first at time $f$ and blocking oscillator 10 will be triggered into operation.

The result of the above operation is that blocking oscillator 10 will generate an output pulse, shown in ideal form in line ($b$) of FIG. 2, during a first time interval while blocking oscillator 11 will generate no output pulse during that same time interval. During the succeeding interval blocking oscillator 11 will generate an output pulse, shown in ideal form in line $c$ of FIG. 2, while blocking oscillator 10 will not generate an output pulse. The result of this process as shown in lines ($b$) and ($c$) of FIG. 2 is that pulses of the same polarity are generated alternately in time at parallel or separate output terminals each connected to the collector 17 of the appropriate one of blocking oscillators 10 and 11 and that during the presence of a pulse at one output terminal the other output terminal remains passive.

The frequency of operation or the repetition frequency may be determined by the following analysis obtained by reference to FIGS. 1 and 2. During the period $ab$ shown in FIG. 2 capacitor 15 of blocking oscillator 10 is being charged by the constant base current $I_b$ flowing in the transistor (neglecting the resistance of resistor 14 which is relatively high). Therefore the charge accumulated on capacitor 15

$$Q=I_bt_{ab}=C(V_1+V_d-V_e) \qquad (1)$$

where $t_{ab}$ is the time interval $ab$ and C is the capacitance of capacitor 15, where $V_e$ is the external voltage 20 applied to the emitter, where $V_d$ is the voltage drop across diodes 21 and 22, and where $V_1$ is the voltage on capacitor 15 of blocking oscillator 11 at time $b$. At time $b$ the voltage at point A is greater than the voltage at point B by an amount equal to $V_d$ and capacitor 15 of blocking oscillator 11 begins to charge. The rate of charge on capacitor 15 of blocking oscillator 10 is now reduced since a portion of the base current $I_b$ has been directed to charge capacitor 15 of blocking oscillator 11. During the period $bc$ $$I_bt_{bc}=2C[V_p-(V_1+V_d)] \qquad (2)$$

where $t_{bc}$ is the time interval between $b$ and $c$. The pulse width $$W=t_{ab}+t_{bc} \qquad (3)$$

During the period $cd$ the voltage at point A declines exponentially from its peak value $V_p$ to $V_1$. Therefore $$V_1=V_p\epsilon^{-t_{cd}/RC} \qquad (4)$$

where $t_{cd}$ is the time interval between $c$ and $d$. During the period $de$ the voltage at point A increases from $V_1$ to $V_p-V_d$ due to the base current $I_b$. Therefore $$I_bt_{de}=2C[(V_p-V_d)-V_1] \qquad (5)$$

$$t_{de}=t_{bc}$$

where $t_{de}$ is the time interval between $d$ and $e$.

During the period $ef$ the voltage at point A declines to $V_e$ according to the relationship $$V_e=(V_p-V_d)\epsilon^{-t_{ef}/RC} \qquad (6)$$

where $t_{ef}$ is the time interval between $e$ and $f$.

Since the output pulse width W is in reality very short compared to the repetition period (despite the fact that it is shown as very wide with respect to the repetition period in FIG. 2 so as to provide an expanded scale during times $ac$, $a'e$ . . .)

$$t_{ef}\approx t_{cd}\approx T \text{ (repetition period)}$$

From Equations 1 and 2

$$W=(t_{ab}+t_{bc})=\frac{C}{I_b}(2V_p-V_e-V_1-V_d) \qquad (7)$$

From Equation 6

$$V_p=V_e\epsilon^{T/RC}+V_d \qquad (8)$$

From Equations 4 and 8

$$V_1=(V_e\epsilon^{T/RC}+V_d)\epsilon^{-T/RC} \qquad (9)$$

$$V_1=V_e+V_d\epsilon^{-T/RC}$$

Substituting (8) and (9) in (7)

$$W=\frac{C}{I_b}[2(V_e\epsilon^{T/RC}+V_d)-V_e-(V_e+V_d\epsilon^{-T/RC})-V_d]$$

$$W=\frac{C}{I_b}[2V_e\epsilon^{T/RC}+2V_d-V_e-V_e-V_d\epsilon^{-T/RC}-V_d]$$

$$\frac{I_bW}{c}=[2V_e\epsilon^{T/RC}+V_d-2V_e-V_d\epsilon^{-T/RC}]$$

$$\frac{I_bW}{c}-V_d+2V_e=2V_e\epsilon^{T/RC}-V_d\epsilon^{-T/RC}$$

now, $$2V_e\epsilon^{T/RC}\gg V_d\epsilon^{-T/RC} \text{ since } V_e\approx 10V_d$$

Similarly, $2V_e\gg V_d$. Therefore $$\frac{I_bW-\cancel{V_dC}+2V_eC}{2V_eC}=\epsilon^{T/RC}$$

Therefore $$T=RC\ln\left[\frac{I_bW-\cancel{V_dC}+2V_eC}{2V_eC}\right] \qquad (10)$$

$$T=RC\ln\left[\frac{I_bW+2V_eC}{2V_eC}\right] \qquad (11)$$

where ln denoes the natural logarithm.

Thus for given values of capacitor 15 and resistor 14 the period may be determined if the values of $I_b$ and W are known. As is well known in the art the best approach, due to the non-linearities of the blocking oscillator, to determine these values, is an empirical approach. Once these values have been determined for individual blocking oscillators 10 and 11 the results obtained may be substituted in Equation 11 to determine the period for the two-phase pulse generator.

Application of these principles in accordance with the invention therefore yields a two-phase pulse generator without the necessity of resorting to elaborate control circuits to govern the operation of the blocking oscillators as required by the prior art. In accordance with applicant's invention the blocking oscillators are self-synchronized by means of a simple passive interconnecting circuit, whose reliability is much greater than the more elaborate active circuits required by the prior art.

It is to be understood that the above-described arrangements are illustrative of the application of the principles of the invention. Numerous other arrangements may be devised by those skilled in the art without departing from the spirit and scope of the invention.

What is claimed is:

1. An astable pulse generator comprising two blocking oscillators each having a timing circuit comprising a capacitor which is charged during periods of conduction of the blocking oscillator and discharged during periods of non-conduction of the blocking oscillator, and voltage dropping means connected between said capacitors to divert charging current from the capacitor of each blocking oscillator during a portion of its respective charging period and to supply the diverted current to the capacitor of the other blocking oscillator, prolonging the respective discharge periods, whereby the blocking oscillators are locked to generate pulses of like polarity in alternate portions of the oscillating cycle.

2. Apparatus as claimed in claim 1 wherein said voltage dropping means comprises a resistor.

3. Apparatus as claimed in claim 1 wherein said voltage dropping means comprises the parallel combination of two diodes, the first poled to provide a low impedance to current flowing in a first direction and the second poled to provide a low impedance to current flow in the opposite direction.

4. An astable pulse generator comprising, in combination, two blocking oscillators each comprising an active element having a current emissive electrode, a current receiving electrode, and a control electrode to govern current flow between said current emissive and current receiving electrodes, a phase inverting pulse transformer having one winding connected between said current receiving electrode and a source of reference potential and a second winding having two terminals with a first connected to said control electrode, a timing circuit comprising the parallel combination of a resistor and a capacitor connected between the second terminal of said second winding and said source of reference potential, and voltage dropping means connected between said second terminals of said second windings of said pulse transformers to divert charging current from the capacitor of each blocking oscillator during a portion of its respective charging period and to supply the diverted current to the capacitor of the other blocking oscillator, prolonging the respective discharge periods, whereby the blocking oscillators are locked to generate pulses of like polarity in alternate portions of the oscillating cycle.

5. Apparatus as claimed in claim 4 wherein said voltage dropping means comprises a resistor.

6. Apparatus as claimed in claim 4 wherein said voltage dropping means comprises the parallel combination of two diodes, the first poled to provide a low impedance to current flow in a first direction and the second poled to provide a low impedance to current flow in the opposite direction.

References Cited in the file of this patent

UNITED STATES PATENTS

| | | |
|---|---|---|
| 2,736,806 | Miller | Feb. 28, 1956 |
| 3,023,375 | Sheridan et al. | Feb. 27, 1962 |